C. HEINEL.
FASTENER FOR METAL BELTS.
APPLICATION FILED MAY 26, 1910.
983,712.
Patented Feb. 7, 1911.
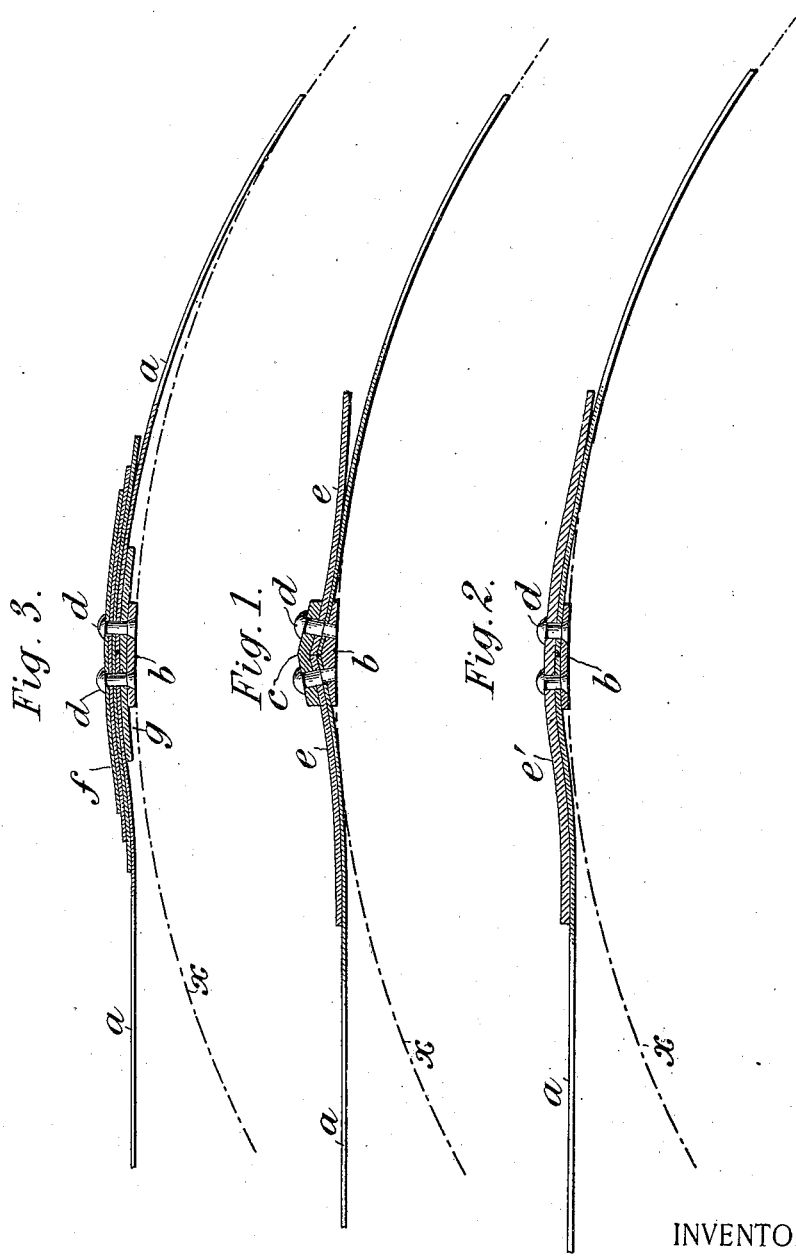
WITNESSES:
INVENTOR
Carl Heinel,
By Attorneys,

UNITED STATES PATENT OFFICE.

CARL HEINEL, OF FRIEDENAU, GERMANY.

FASTENER FOR METAL BELTS.

983,712.  Specification of Letters Patent.  Patented Feb. 7, 1911.

Application filed May 26, 1910. Serial No. 563,641.

*To all whom it may concern:*

Be it known that I, CARL HEINEL, a subject of the Emperor of Germany, residing in Friedenau, Germany, have invented certain new and useful Improvements in Fasteners for Metal Belts, of which the following is a specification.

The object of this invention is a fastener for steel belts.

Fasteners are already known in which longitudinally extending plates are provided in order to keep the bending strains of the belt at the fastening points or splices within moderate limits. The form of such plates was fixed once for all and the fastener had to be made rigid enough to sustain the recurring bending strains and to prevent the longitudinal plates from suffering either an elastic or permanent change in form. This resulted in the necessity of making the fasteners rather thick. When the pulleys run fast the heavy fastener tends to continue in the direction once acquired, so that the belt is in a manner bent away from the fastener, and it is due to this cause that breakages occur. This evil is sought to be removed by this invention by having the longitudinal plates made flexible and not rigid. The plates are made of such length and thickness that the curve radius of the steel belt at the fastening point in the fastener can never become so small that an injurious bending strain could occur in it. Apart from the fact that the fastener is light in weight and therefore possesses but a slight degree of inertia, the elastic plates have the effect that the fastener can not possibly fly off, as the free blade is pressed against the pulley by the other blade.

In the accompanying drawings, Figures 1, 2 and 3 are each longitudinal sections through the belt fastening, showing the belt as partly bent around a pulley, the arc of which is shown by a dotted line $x$.

In each of the figures $a$ is the steel belt, $b$ is the lower or inner splice plate, $c$ is the upper or outer splice plate and $d$ $d$ are the fastening rivets (or screws or other fastenings).

In the construction shown in Fig. 1, the longitudinal plates $e$ $e$ are to be made of sheet steel of such thickness that (1) the bending strain at the fastening point in the fastener is kept within moderate limits, and (2) the curve radius of the deflected blade becomes nowhere too small. It is preferable therefore to make the longitudinal plates or blades of varying thickness, being thicker toward the middle or near the joint than toward the outer end or ends of the plate. In Fig. 1 the fastener comprises two distinct spring plates or blades $e$ $e$ and the inner and outer plates $b$ and $c$ are given the section shown so that the abutting ends of the belt $a$ meet at an angle.

In Fig. 2 the construction is simplified in that only a single plate $e'$ is used which at the joint is sufficiently thick to receive the rivets so that a separate outer plate $c$ is unnecessary. Thus, in Fig. 2 the plate $e'$ becomes the medium through which the tensile stress is transmitted, whereas in Fig. 1 this stress is transmitted through the outer plate $c$. In Fig. 2 the plate $e'$ is gently curved toward its end portions to exert the desired pressure upon the belt.

In Fig. 3 the arrangement is similar to that of Fig. 2 except that instead of a single longitudinal plate the latter is built up of superposed plates or laminæ $f$ $f$, these being of graduated length and combined somewhat after the manner of laminated springs for vehicles. Also a flat steel spring $g$ is clamped between the inner plate $b$ and the steel belt in order to strengthen the inner plate where it is weakened by the countersinking of the rivet heads.

By increasing the thickness of the elastic longitudinal plate toward the middle the bending strains and the resulting radii of deflection are kept at all points within the proper limits. Whether the plate is laminated or not it is preferable to give one of its ends a permanent curve which is convex on the side toward the belt and which tangents the curve of the driving pulley as the belt flexes around the latter. The invention may be otherwise modified in construction as may be suggested by the skill of the mechanic or engineer, and according to the particular nature of the belt and the special conditions to which it is to be subjected.

I claim as my invention:—

1. A fastener for belts comprising a plate member adapted to be connected with the belt near its meeting ends, and having an elastic portion adapted to extend along the belt for a considerable distance in both directions beyond the joint of the belt, and being disconnected from the belt at such extended portion and means for attaching a belt to said fastener.

2. A fastener for sheet metal driving belts having means for connecting the edges of the belt, and an elastic longitudinally-extending plate portion adapted to extend along said belt for a considerable distance in both directions beyond said connecting means, the end portions of said plate being disconnected from said belt.

3. A fastener for sheet-metal driving belts having rigid means adapted to lie on a side of said belt for connecting the ends of the latter, and having on its outer side elastic longitudinally-extending plate portions adapted to extend in both directions from and beyond said connecting means along the outer side of said belt, with its end-portions or extensions disconnected from said belt.

4. The combination with a flat sheet-metal belt, of fastening means for its ends, said means having a longitudinally-extending plate of elastic material on the outer side of said belt extending beyond the fastening means in both directions, said plate being disconnected from said belt beyond said fastening means.

5. A fastener for sheet-metal driving belts comprising an inner fastening plate and an outer longitudinally-extending plate between which the ends of the belt are confined, the longitudinally-extending plate being of elastic material, of varying thickness and extending beyond the plate in each direction, its cross-section increasing toward the center, the extensions or end portions of said plate being disconnected from said belt.

6. A fastener for sheet-metal driving belts comprising an inner fastening plate and an outer longitudinally-extending plate between which the ends of the belt are confined, the longitudinally-extending plate being of elastic material and extending beyond the plate in each direction, the extensions or end portions of said plate being disconnected from said belt and concaved.

7. A fastener for sheet-metal driving belts comprising an inner fastening plate and an outer longitudinally-extending plate between which the ends of the belt are confined, the longitudinally-extending plate being built up of a plurality of laminæ of elastic material, extending beyond the plate in each direction.

8. A fastener for sheet-metal driving belts comprising an inner fastening plate and an outer longitudinally-extending plate between which the ends of the belt are confined, the longitudinally-extending plate being of elastic material, and a yielding plate interposed between the inner plate and the belt.

In witness whereof, I have hereunto signed my name in the presence of two subscribing witnesses.

CARL HEINEL.

Witnesses:
 HENRY HASPER,
 WOLDEMAR HAUPT.